United States Patent [19]

Takano

[11] Patent Number: 5,418,356
[45] Date of Patent: May 23, 1995

[54] READING OPTICAL SYSTEM

[75] Inventor: Masahito Takano, Tokyo, Japan

[73] Assignee: Asahi Kogaku Kogyo Kabushiki Kaisha, Tokyo, Japan

[21] Appl. No.: 197,174

[22] Filed: Feb. 16, 1994

[30] Foreign Application Priority Data

Feb. 18, 1993 [JP] Japan .................. 5-028761

[51] Int. Cl.⁶ .............................. G06K 7/10
[52] U.S. Cl. ................... 235/462; 235/472; 359/740
[58] Field of Search .......... 235/462, 472; 359/739, 359/740, 732

[56] References Cited

U.S. PATENT DOCUMENTS 4,818,856  4/1989  Matsushima et al. .......... 235/462 X

FOREIGN PATENT DOCUMENTS 4191716  7/1992  Japan ............................ 359/739

*Primary Examiner*—Donald Hajec
*Assistant Examiner*—Michael G. Lee
*Attorney, Agent, or Firm*—Sandler, Greenblum & Bernstein

[57] ABSTRACT

A reading optical system is provided which includes a diaphragm and a positive meniscus lens having a concave surface, wherein the concave surface is located on the side of the lens nearest to the diaphragm, and wherein the following relationship exists;

$$0.15 < (d1+d2)/f < 0.41$$

$$0.35 < (d1+d2)/|r1| < 0.85$$

wherein "(d1+d2)" designates the sum of the distance between the diaphragm and the lens and the thickness of the lens, "f" the focal length the meniscus lens, and "r1" the radius of curvature of a surface located on an objective side of the meniscus lens.

6 Claims, 19 Drawing Sheets astigmatism

Y = 13.72

— S
-- M

-1.0   1.0
astigmatism

Y = 0.00

Y = 6.00

Y = 10.00

Y = 13.72

Y = 13.72

— S
-- M

-1.0  1.0
astigmatism

Y = 13.72

— S
-- M

-1.0  1.0
astigmatism astigmatism astigmatism

Y = 13.72

— S
-- M

-1.0  1.0
astigmatism astigmatism

READING OPTICAL SYSTEM

BACKGROUND OF THE INVENTION

1. Field of the Invention

The present invention relates to a reading optical system which is particularly beneficial for a non-scanning type barcode reader in which a predetermined pattern of data, such as a bar code, is imaged on a linear line sensor array to thereby read the data.

2. Description of Related Art

In a conventional non-scanning type bar code reader, a data reading optical system incorporated therein is usually includes of at least two imaging lenses. To effectively make light emitted from a light source incident upon the line sensor array, it is necessary to use imaging lenses whose f-number is small, in view of a relatively low sensitivity of the line sensor (e.g. CCD). An aberration such as a spherical aberration tends to occur when an imaging lens having a small f-number is used. To compensate for the aberration, at least two imaging lenses were used in combination in the prior art.

Increasing the number of lenses, however, prevents the realization of a small and light optical system.

SUMMARY OF THE INVENTION

The primary object of the present invention is to provide a small and light reading optical system in which a single imaging lens is employed.

To achieve the object mentioned above, according to the present invention, a reading optical system is provided which includes a diaphragm and a positive meniscus lens having a concave surface, wherein the concave surface is located on the side of the lens nearest to the diaphragm, and wherein the following relationship exists;

$$0.15 < (d1+d2)/f < 0.41$$

$$0.35 < (d1+d2)/|r1| < 0.85$$

wherein "(d1+d2)" designates the sum of the distance between the diaphragm and the lens and the thickness of the lens, "f" the focal length, and "r1" the radius of curvature of a surface located on an objective side of the meniscus lens.

According to another aspect of the present invention, a bar code reader is provided which includes a light source which emits light onto a bar code, a reading optical system which forms an image of the light reflected from the bar code, and a line sensor provided at an image forming position of the reading optical system where the image is formed. The reading optical system includes a diaphragm and a positive meniscus lens, with a surface of the positive meniscus lens nearest to the diaphragm being concave, and wherein the following relationship exists;

$$0.15 < (d1+d2)/f < 0.41$$

$$0.35 < (d1+d2)/|r1| < 0.85$$

wherein "(d1+d2)" designates the sum of the distance between the diaphragm and the lens and the thickness of the lens, "f" the focal length, and "r1" the radius of curvature of the surface located on an objective side of the meniscus lens.

The present disclosure relates to subject matter contained in Japanese Patent Application No. HEI 5-28761 (filed on Feb. 18, 1993) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

The following discussion will be directed to a bar code reader to which a reading optical system of the present invention is applied.

Figure 1:
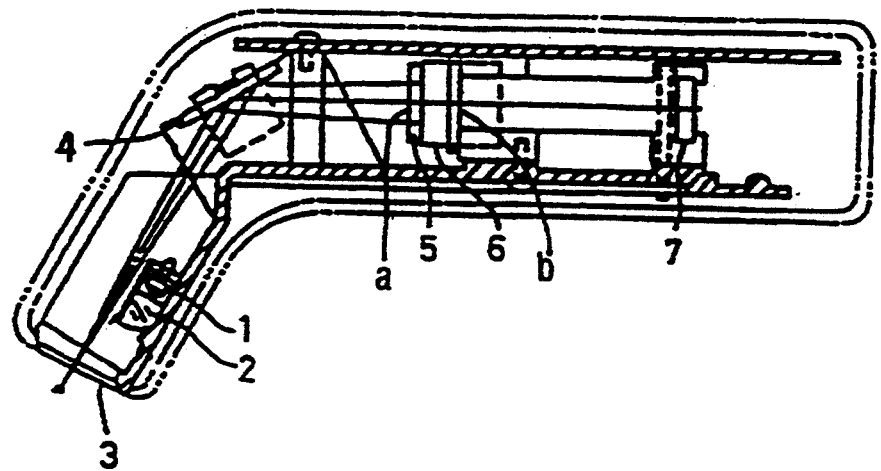
FIG. 1 is a partially sectioned side view of a bar code reader having a reading lens system incorporated therein, according to the present invention.

As can be seen in FIG. 1, the bundle of rays emitted from a light source including a plurality of light emitting diodes (LED's) 1 is transmitted through a projecting lens 2 and a cover glass 3, which constitutes a color filter to cut a long wavelength component, and is made incident upon an object to be read, i.e., a bar code (not shown). Light reflected from the bar code is reflected by a mirror 4 and transmitted through a color filter 5, which cuts a short wavelength component, and a reading lens system 6 to be converged onto a CCD line sensor 7.

The output signals of the CCD line sensor 7 is decoded by a decoder (not shown) to read data of the bar code pattern.

The cover glass 3 and the color filter 5 serve as band pass filters to permit only the peak wavelength of light emitted from the LED's 1 to reach the CCD line sensor 7, so that chromatic aberration of the imaging lens, which would be otherwise caused by extraneous light, does not occur.

A reading optical system that includes the imaging lens incorporated in the bar code reader as constructed above will be discussed below.

Figure 2:
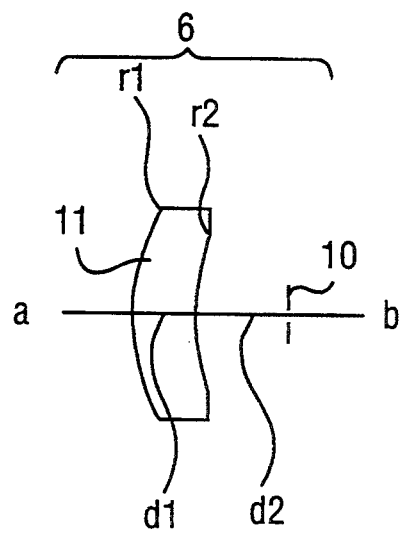
FIG. 2 is a schematic diagram of a lens reading lens system according to a first embodiment of the present invention.

The reading optical system includes, for example, a diaphragm 10 and a positive meniscus lens 11 having a concave surface facing the diaphragm 10, as can be seen in FIG. 2. In the first and second embodiments which will be discussed below, the meniscus lens 11 and the diaphragm 10 are located in this order as viewed from the object side a towards sensor side b. Conversely, in the third through eighth embodiments which will be described hereinafter, the diaphragm 10 and the meniscus lens 11 are located in this order as viewed from the object side.

Figure 27:
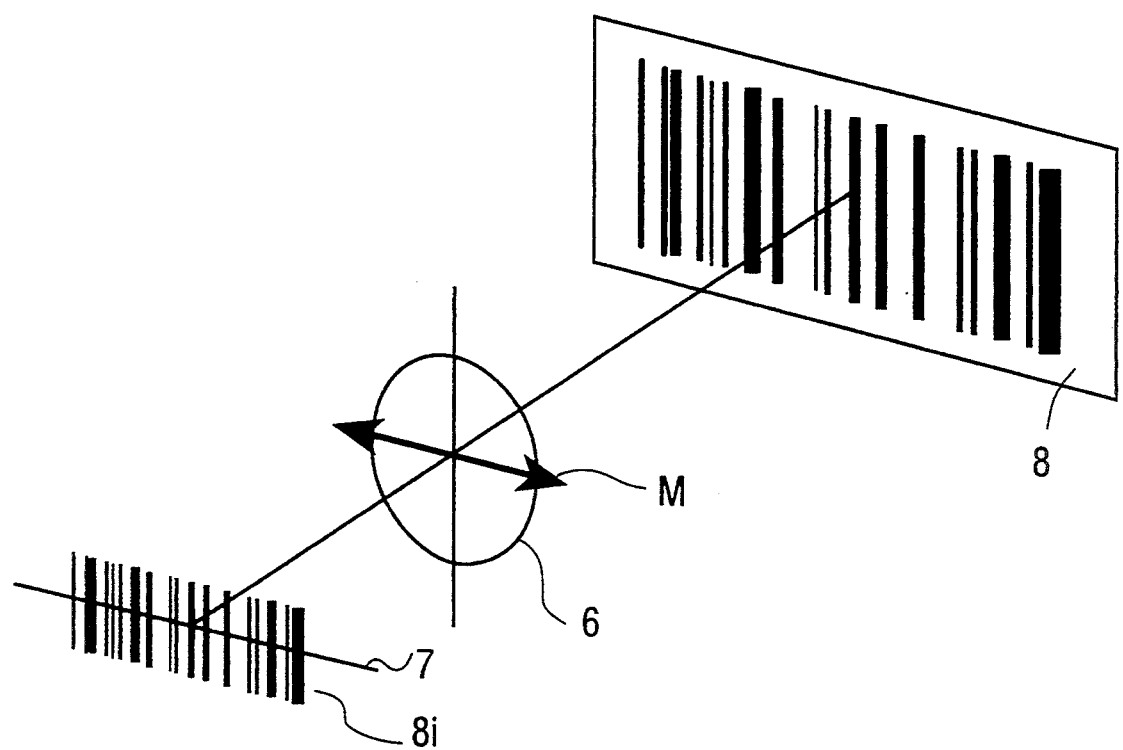

FIG. 27 is a conceptual view of a reading optical system in which the bar code pattern 8 is read by the linear line sensor array 7 through the reading lens system 6. An image 8i of the bar code pattern 8 is formed on the line sensor array 7. The inventors of the present invention have found that it is necessary to take only a meridional plane into consideration with respect to the reading lens system 6 and, accordingly, disregard a sagittal plane, in an optical system in which the bar code pattern 8 is read by the linear line sensor array 7.

In addition to the above, the recent advanced technology has increased the sensitivity of the CCD line sensor. This has made it possible to use a dark lens having a large f-number in a reading optical system. If the highly sensitive CCD line sensor is used, it is not necessary to correct the spherical aberration by the reading optical system, since the spherical aberration can be restricted by reducing the diaphragm aperture (i.e., increasing the f-number).

Furthermore, it is also unnecessary to compensate for the chromatic aberration by the reading optical system, since the chromatic aberration can be eliminated by using light of a single wavelength (i.e., monochromatic light) or reducing the wavelength band of light incident upon the line sensor using a filter or the like.

Under these circumstances, i.e., in which the field flatness of the sagittal plane can be withdrawn from consideration (only the field flatness in the meridional plane must be flat) and that necessities for correcting the spherical aberration or chromatic aberration for the reading optical system are small, the reading optical system, according to the present invention, can be designed taking only the performance as an imaging lens into account.

Namely, the reading optical system according to the present invention includes a single lens and a diaphragm which together satisfy the following requirements;

$$0.15 < (d1+d2)/f < 0.41 \qquad (1)$$

$$0.35 < (d1+d2)/|r1| < 0.85 \qquad (2)$$

wherein "(d1+d2)" designates the sum of the distance of the lens and the diaphragm and the thickness of the lens, "f" the focal length, and "r1" the radius of curvature of the surface of the meniscus lens that is located on the object side.

Formula (1) defines the requirement necessary to obtain a flat field in the meridional plane. If the value of $(d1+d2)/f$ is below 0.15, the curvature of field in the meridional plane is too large, and if the value of $(d1+d2)/f$ is above 0.41, the field of curvature in the meridional plane will be too small.

Formula (2) defines the requirement necessary to correct the coma. If there is coma aberration, the resolution in the meridional direction is lowered and the reading depth can be enhanced. If the value of $(d1+d2)/|r1|$ is above 0.35 and below 0.85, the resolution and the reading depth are well balanced.

Eight examples (i.e., embodiments) of a reading optical system which satisfy the relationship defined by formulas (1) and (2) are given below. In the examples, "f" connotes the focal length, "r1" the radius of curvature of the lens surface of the lens on the objective side, "r2" the radius of curvature of the lens surface of the lens on the image surface side, "M" the magnification, "n" the refractive index of the d-line (588 nm) of the lens, and "ν" the Abbe number, respectively. In the eight examples, F number ($F_{NO}$) is 16 constant for a light from infinity.

EXAMPLE 1

In the first two examples (i.e., first and second embodiments), "d1" designates the lens thickness, and "d2" the distance between the surface of the lens nearest to the image surface and the diaphragm, respectively. In the other examples (i.e., third through eighth embodiments), "d1" designates the distance between the lens surface of the lens on the objective side and the diaphragm, and "d2" the lens thickness, respectively.

Figure 3:
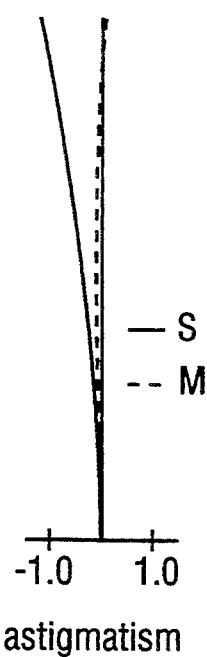
FIG. 3 is a diagram of an astigmatism of a reading lens system according to a first embodiment of the present invention.
Figure 4:
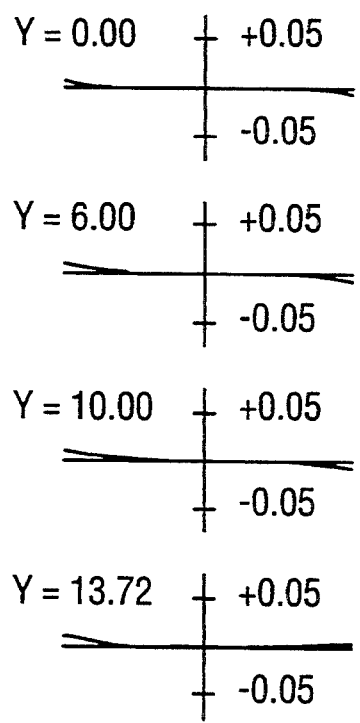
FIG. 4 is a diagram of a transverse aberration of a reading lens system according to a first embodiment of the present invention.

FIG. 2 shows a first embodiment of a lens structure in a reading optical system. Numerical data thereof is shown in Table 1 below. FIGS. 3 and 4 show the astigmatism (S: sagittal, M: meridional) and the transverse aberration in the first embodiment, respectively.

TABLE 1

| f | 17.21 | M | −0.381 | | |
|---|---|---|---|---|---|
| r1 | 4.540 | d1 | 1.50 | n | 1.77250 |
| r2 | 5.924 | d2 | 2.11 | ν | 49.6 |

EXAMPLE 2

Figure 5:
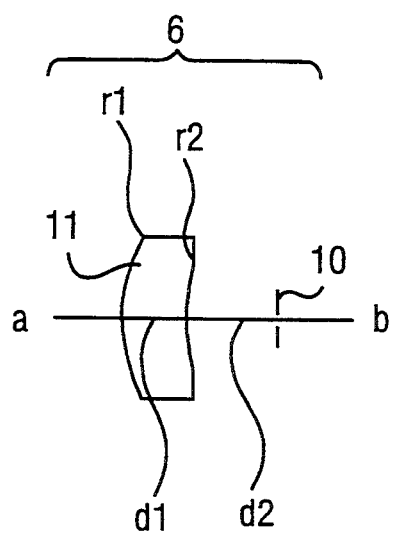
FIG. 5 is a schematic diagram of a lens reading lens system according to a second embodiment of the present invention.
Figure 6:
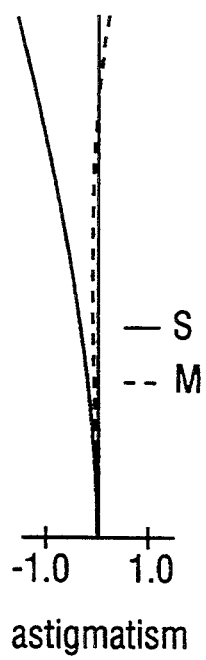
FIG. 6 is a diagram of an astigmatism of a reading lens system according to a second embodiment of the present invention.
Figure 7:
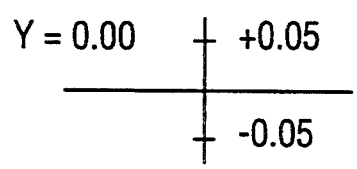
FIG. 7 is a diagram of a transverse aberration of a reading lens system according to a second embodiment of the present invention.
Figure 7:
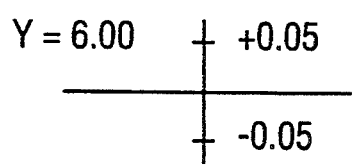
Figure 7:
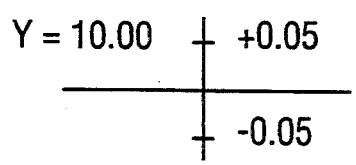
Figure 7:
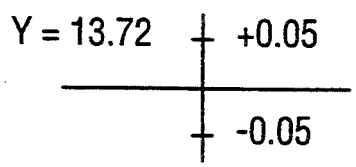

FIG. 5 shows a second embodiment of a lens structure in a reading optical system. Numerical data thereof is shown in Table 2 below. FIGS. 6 and 7 show the astigmatism and the transverse aberration in the second embodiment, respectively.

TABLE 2

| f | 17.21 | M | −0.381 | | |
|---|---|---|---|---|---|
| r1 | 3.790 | d1 | 1.50 | n | 1.51633 |
| r2 | 5.742 | d2 | 1.63 | ν | 64.1 |

EXAMPLE 3

Figure 8:
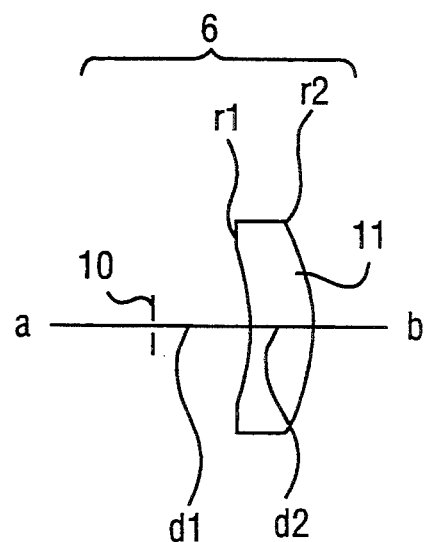
FIG. 8 is a schematic diagram of a lens reading lens system according to a third embodiment of the present invention.
Figure 9:
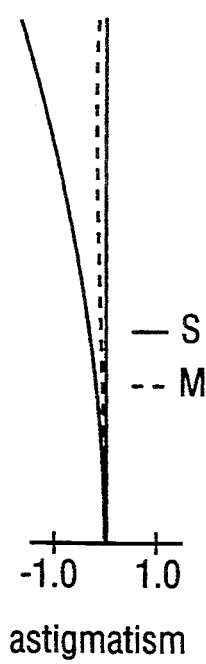
FIG. 9 is a diagram of an astigmatism of a reading lens system according to a third embodiment of the present invention.
Figure 10:
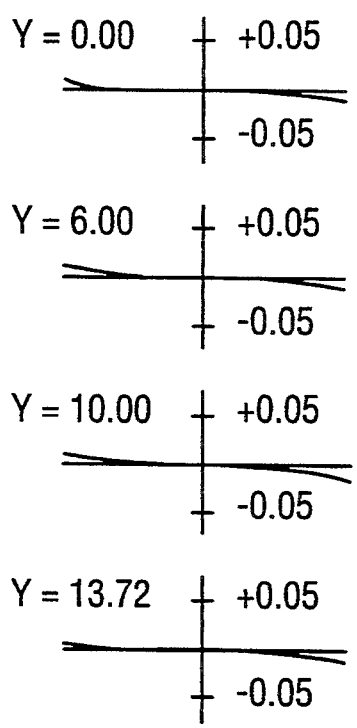
FIG. 10 is a diagram of a transverse aberration of a reading lens system according to a third embodiment of the present invention.

FIG. 8 shows a third embodiment of a lens structure in a reading optical system. Numerical data thereof is shown in Table 3 below. FIGS. 9 and 10 show the astigmatism and the transverse aberration in the third embodiment, respectively.

TABLE 3

| f | 17.20 | M | −0.446 | | |
|---|---|---|---|---|---|
| r1 | −9.170 | d1 | 2.69 | n | 1.69680 |
| r2 | −5.529 | d2 | 1.50 | ν | 55.5 |

EXAMPLE 4

Figure 11:
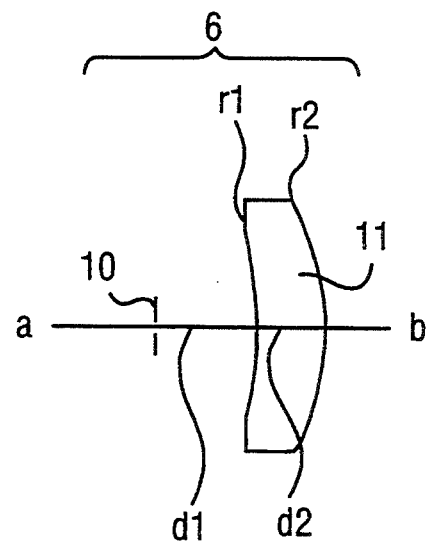
FIG. 11 is a schematic diagram of a lens reading lens system according to a fourth embodiment of the present invention.
Figure 12:
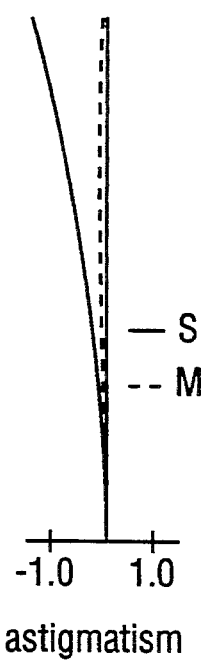
FIG. 12 is a diagram of an astigmatism of a reading lens system according to a fourth embodiment of the present invention.
Figure 13:
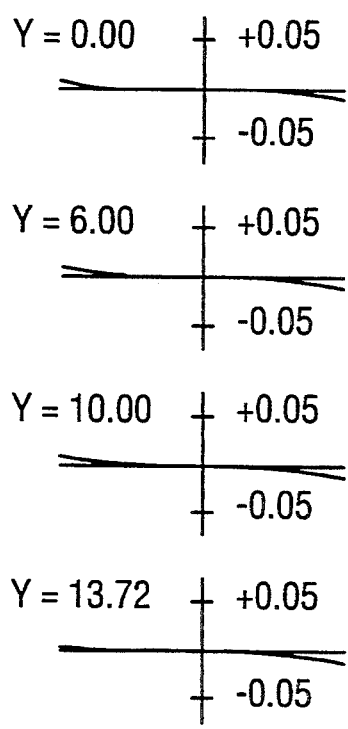
FIG. 13 is a diagram of a transverse aberration of a reading lens system according to a fourth embodiment of the present invention.

FIG. 11 shows a fourth embodiment of a lens structure in a reading optical system. Numerical data thereof is shown in Table 4 below. FIGS. 12 and 13 show the astigmatism and the transverse aberration in the fourth embodiment, respectively.

TABLE 4

| f | 17.20 | M | −0.444 | | |
|---|---|---|---|---|---|
| r1 | −9.280 | d1 | 2.97 | n | 1.84666 |
| r2 | −6.055 | d2 | 1.50 | ν | 23.9 |

EXAMPLE 5

Figure 14:
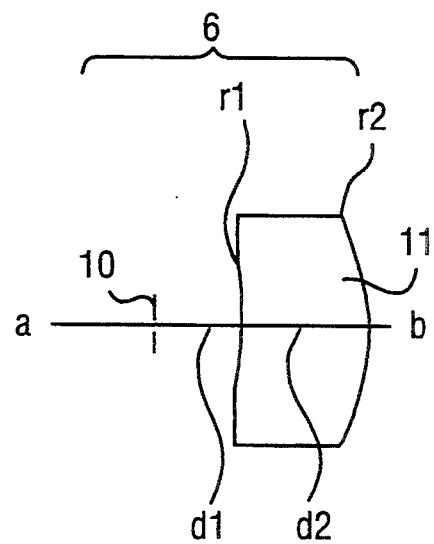
FIG. 14 is a schematic diagram of a lens reading lens system according to a fifth embodiment of the present invention.
Figure 15:
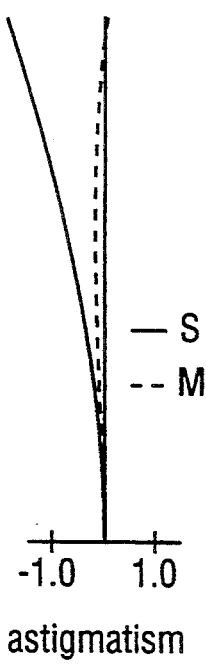
FIG. 15 is a diagram of an astigmatism of a reading lens system according to a fifth embodiment of the present invention.
Figure 16:
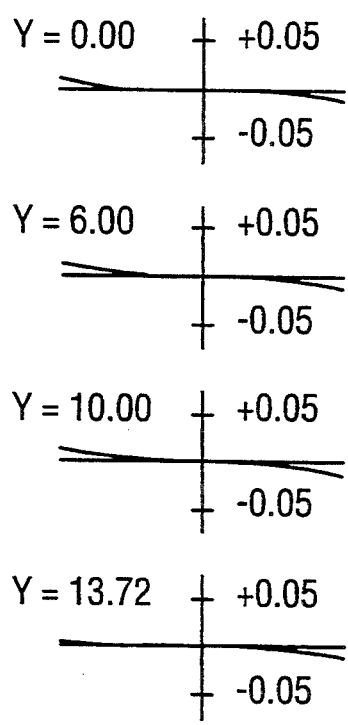
FIG. 16 is a diagram of a transverse aberration of a reading lens system according to a fifth embodiment of the present invention.

FIG. 14 shows a fifth embodiment of a lens structure in a reading optical system. Numerical data thereof is shown in Table 5 below. FIGS. 15 and 16 show the astigmatism and the transverse aberration in the fifth embodiment, respectively.

TABLE 5

| f | 17.20 | M | −0.445 | | |
|---|---|---|---|---|---|
| r1 | −10.700 | d1 | 1.50 | n | 1.51633 |
| r2 | −5.300 | d2 | 3.00 | ν | 64.1 |

EXAMPLE 6

Figure 17:
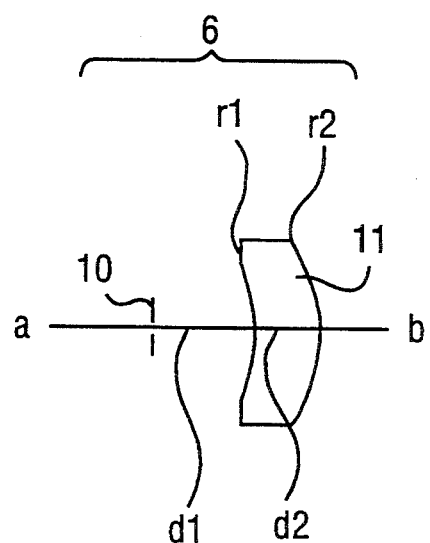
FIG. 17 is a schematic diagram of a lens reading lens system according to a sixth embodiment of the present invention.
Figure 18:
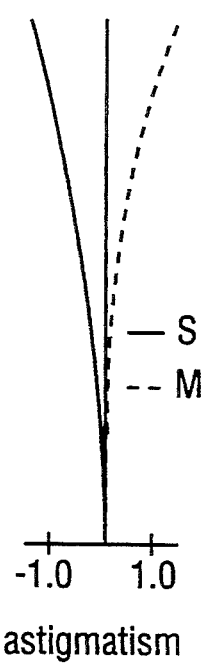
FIG. 18 is a diagram of an astigmatism of a reading lens system according to a sixth embodiment of the present invention.
Figure 19:
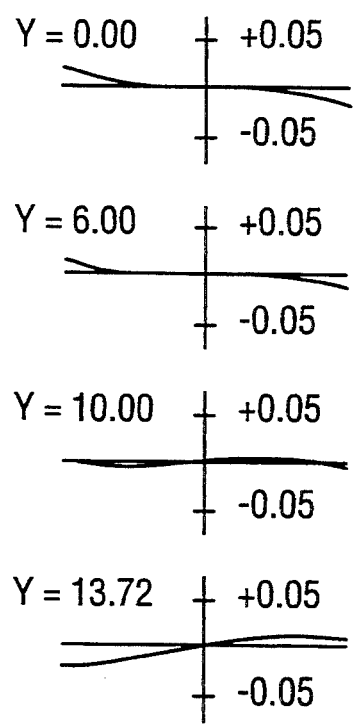
FIG. 19 is a diagram of a transverse aberration of a reading lens system according to a sixth embodiment of the present invention.

FIG. 17 shows a sixth embodiment of a lens structure in a reading optical system. Numerical data thereof is shown in Table 6 below. FIGS. 18 and 19 show the astigmatism and the transverse aberration in the sixth embodiment, respectively.

TABLE 6

| f | 17.20 | M | −0.451 | | |
|---|---|---|---|---|---|
| r1 | −6.640 | d1 | 1.70 | n | 1.51633 |
| r2 | −4.082 | d2 | 1.50 | ν | 64.1 |

EXAMPLE 7

Figure 20:
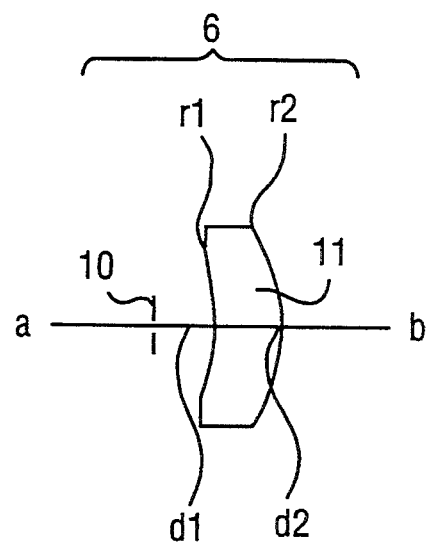
FIG. 20 is a schematic diagram of a lens reading lens system according to a seventh embodiment of the present invention.
Figure 21:
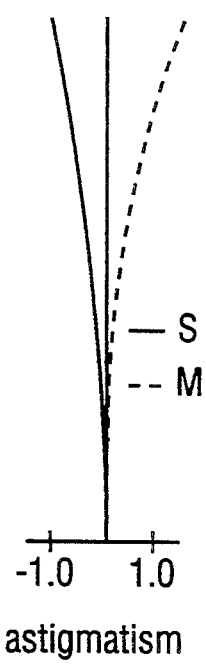
FIG. 21 is a diagram of an astigmatism of a reading lens present invention.
Figure 22:
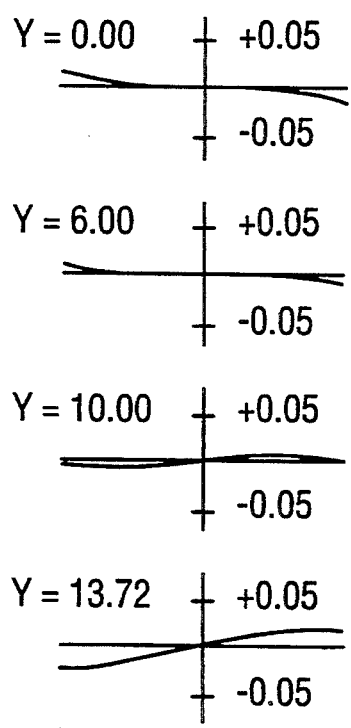
FIG. 22 is a diagram of a transverse aberration of a reading lens system according to a seventh embodiment of the present invention.

FIG. 20 shows a seventh embodiment of a lens structure in a reading optical system. Numerical data thereof is shown in Table 7 below. FIGS. 21 and 22 show the astigmatism and the transverse aberration in the seventh embodiment, respectively.

TABLE 7

| f | 17.20 | M | −0.448 | | |
|---|---|---|---|---|---|
| r1 | −6.620 | d1 | 2.00 | n | 1.69680 |
| r2 | −4.650 | d2 | 1.50 | ν | 55.5 |

EXAMPLE 8

Figure 23:
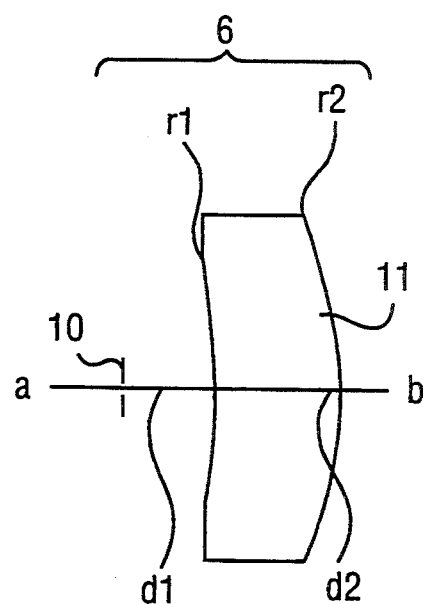
FIG. 23 is a schematic diagram of a lens reading lens system according to an eighth embodiment of the present invention.
Figure 24:
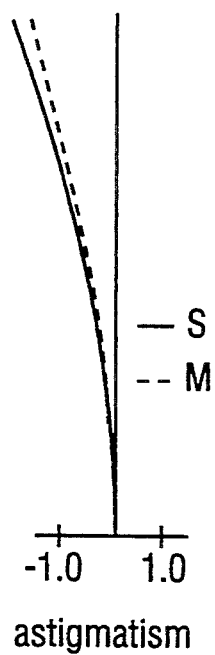
FIG. 24 is a diagram of an astigmatism of a reading lens system according to an eighth embodiment of the present invention.
Figure 25:
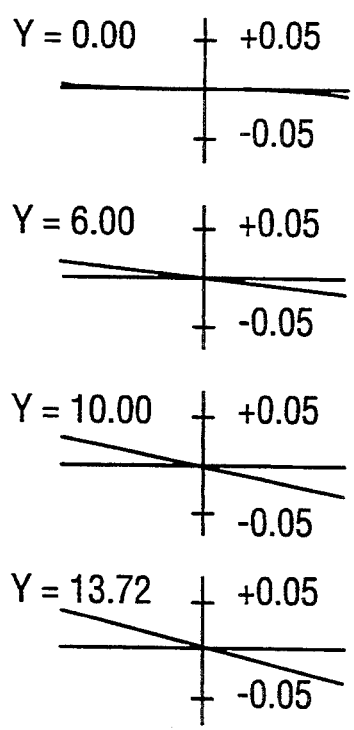
FIG. 25 is a diagram of a transverse aberration of a reading lens system according to an eighth embodiment of the present invention.

FIG. 23 shows an eighth embodiment of a lens structure in a reading optical system. Numerical data thereof is shown in Table 8 below. FIGS. 24 and 25 show the astigmatism and the transverse aberration in the eighth embodiment, respectively.

TABLE 8

| f | 17.20 | M | −0.437 | | |
|---|---|---|---|---|---|
| r1 | −17.900 | d1 | 3.50 | n | 1.84666 |
| r2 | −8.582 | d2 | 3.00 | ν | 23.9 |

Figure 26:
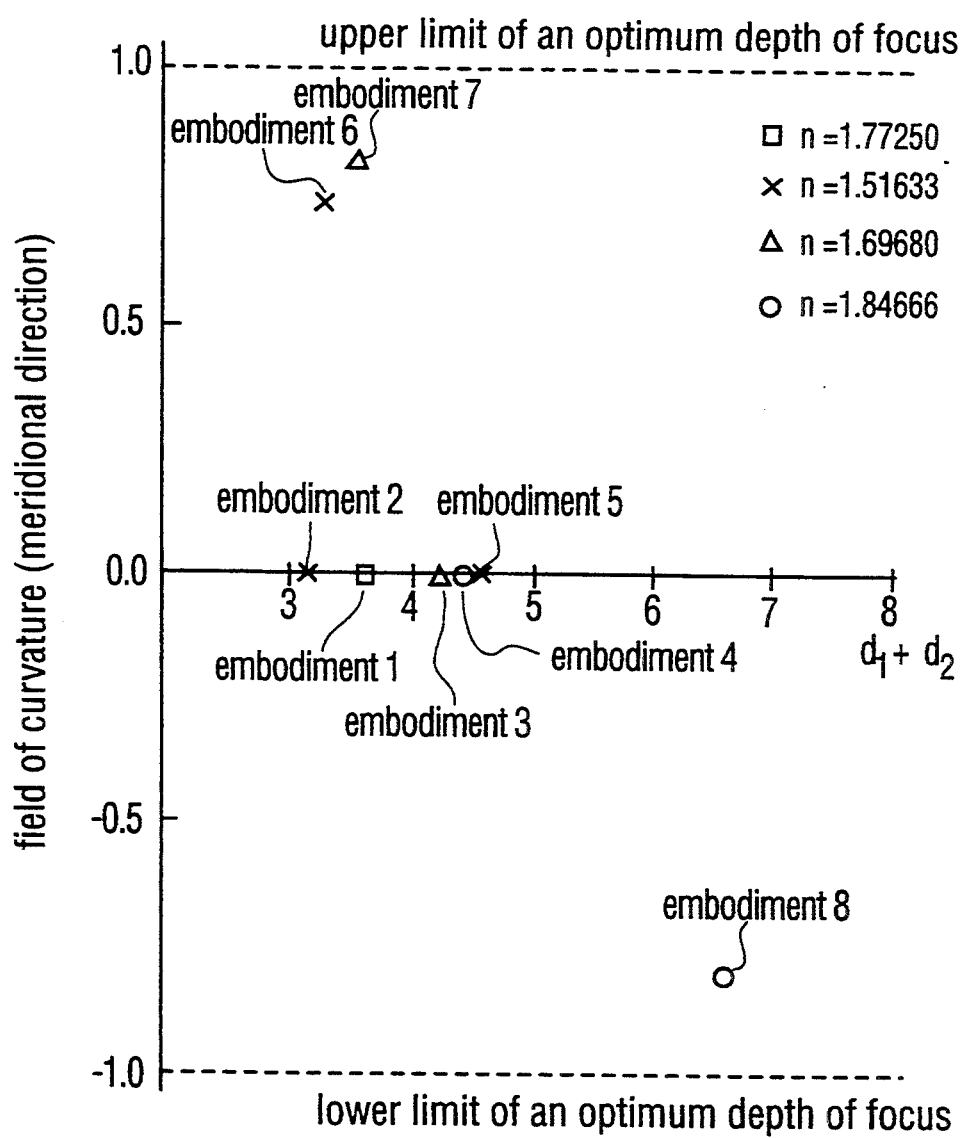
FIG. 26 is a graph of a distribution of the field of curvature in a reading lens system according to first through eighth embodiments of the present invention; and, FIG. 27 is an illustration showing why it is necessary to take only a meridional plane into consideration, ignoring the sagittal plane, in a reading lens system for a bar code reader.

Table 9 below shows a relationship of the above mentioned eight embodiments and the formulas (1) and (2). FIG. 26 shows a curvature of field in the meridional direction with respect to the value of (d1+d2) as a parameter in each embodiment, on the assumption that the magnification and the focal length are constant. It should be appreciated that in each embodiment, the value of the curvature of field is between upper and lower limits (1.0 and −1.0) of an optimum depth of focus.

Note that in FIG. 26, the values of the curvature of field corresponds to those at a point of 70% of the effective maximum image height. This is because the curvature of field of the image surface depends on design. Accordingly, there is a large difference in the value of the curvature of field at the effective maximum image height, resulting in a difficulty in comparing the values.

TABLE 9

| | formula(1) | formula(2) |
|---|---|---|
| 1st embodiment | 0.21 | 0.80 |
| 2nd embodiment | 0.18 | 0.83 |
| 3rd embodiment | 0.24 | 0.46 |
| 4th embodiment | 0.26 | 0.48 |
| 5th embodiment | 0.26 | 0.42 |
| 6th embodiment | 0.19 | 0.48 |
| 7th embodiment | 0.20 | 0.53 |
| 8th embodiment | 0.38 | 0.36 |

As can be understood from the foregoing, according to the present invention, a simple, light and inexpensive reading optical system having a single lens can be provided which has a performance that is sufficient for use in a bar code reader.

I claim:

1. A reading optical system comprising:
   a diaphragm and a positive meniscus lens having a concave surface, wherein the concave surface is located on a side of a lens nearest to the diaphragm, and wherein the following relationship exists;

$$0.15 < (d1+d2)/f < 0.41$$

$$0.35 < (d1+d2)/|r1| < 0.85$$

wherein "(d1+d2)" designates a sum of a distance between the diaphragm and a lens and a thickness of the lens, "f" the focal length of the meniscus lens, and "r1" a radius of curvature of a surface located on an objective side of the meniscus lens.

2. The reading optical system of claim 1, wherein an object to be read is linear data.

3. The reading optical system of claim 2, wherein the linear data is a bar code.

4. The reading optical system of claim 1, wherein the diaphragm and the meniscus lens are located in this order from the objective side.

5. The reading optical system of claim 1, wherein the meniscus lens and the diaphragm are located in this order from the objective side.

6. A bar code reader comprising:
   a light source which emits light onto a bar code;
   a reading optical system which forms an image of the light reflected from the bar code; and,
   a line sensor provided at an image forming position of the reading optical system where the image is formed, wherein the reading optical system includes a diaphragm and a positive meniscus lens, a surface of the positive meniscus lens nearest to the diaphragm being concave, and wherein a following relationship exists;

$$0.15 < (d1+d2)/f < 0.41$$

$$0.35 < (d1+d2)/|r1| < 0.85$$

wherein "(d1+d2)" designates a sum of a distance between the diaphragm and a lens and the thickness of the lens, "f" the focal length of a meniscus lens, and "r1" a radius of curvature of a surface located on an objective side of the meniscus lens.

* * * * *

UNITED STATES PATENT AND TRADEMARK OFFICE
CERTIFICATE OF CORRECTION

PATENT NO. : 5,418,356
DATED : May 23, 1995
INVENTOR(S) : Masahito TAKANO

It is certified that error appears in the above-indentified patent and that said Letters Patent is hereby corrected as shown below:

At column 7, line 21 (claim 1, line 13), change "the" (first occurrence) to ---a---.
At column 8, line 25 (claim 6, line 19), change "the" to ---a---.
At column 8, line 25 (claim 6, line 19), change "a" (first occurrence) to ---the---.

Signed and Sealed this

Thirtieth Day of July, 1996

Attest:

BRUCE LEHMAN

*Attesting Officer*  *Commissioner of Patents and Trademarks*